United States Patent Office 3,366,668
Patented Jan. 30, 1968

3,366,668
2,2′,4′-TRI-HYDROXY BENZOPHENONE ESTERS OF DICARBOXYLIC ACIDS
Albert F. Strobel, Delmar, and Sigmund C. Catino, Castleton, N.Y., assignors to General Aniline & Film Corporation, New York, N.Y., a corporation of Delaware
No Drawing. Continuation-in-part of application Ser. No. 129,246, Aug. 4, 1961. This application Oct. 23, 1965, Ser. No. 504,154
10 Claims. (Cl. 260—475)

This application is a continuation-in-part of application Ser. No. 129,246, filed Aug. 4, 1961, now abandoned.

This invention relates to new and useful ultra-violet absorbing compounds, and to polymeric materials produced by the coreaction of such ultra-violet absorbers with polymer forming compounds and preformed polymers, and in particular to derivatives of 2-hydroxybenzophenones which are ultra-violet absorbing materials and which may be reacted with polymers and polymer-forming reactants to form ultra-violet absorbing polymeric absorbing substances and to the processes for producing such compounds and compositions.

Various organic compounds exhibit the power to absorb electromagnetic radiations within the band of 2,900 to 3,700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of tarnsparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will cause them to spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency problem may not be paramount.

In most of the above applications, whether the ultra-violet absorbing material is to be employed in a plastic film for protection thereof or in a film-forming composition to protect materials to be packaged in such film-formers, or whether they are to be employed in paints, varnishes, lacquers and the like, or as an ingredient in dyeing along with resinous auxiliaries, it has been common practice to intimately admix the ultra-violet absorbing material with the film-forming substance to protect the film-forming material against the ultra-violet light. It had been early recognized, however, that one of the major disadvantages of this technique was the tendency of the ultra-violet absorbing compounds to leach out, migrate or volatilize from the film-forming material whereupon the compositions slowly become more and more susceptible to ultra-violet light degradation. It also has been found that the effectiveness of any ultra-violet absorbing material is related to the degree with which the said compound or material is dispersed throughout the carrier or film-forming material. Often adequate distribution and dispersion was difficult, and the ultimate in protection not forthcoming due to this lack of uniform distribution.

We have now discovered a clas of compounds which not only are outstanding ultra-violet absorbers but are characterized by the presence of functional reactive groups which are capable of coaction or interaction with polymeric substances or polymer forming materials to yield polymeric amides or esters. Such reacted polymers containing a small amount of ester and amide moieties with the ultra-violet absorbing compound not only are characterized by the expected advantageous properties of the polymer in its unmodified form, but the additional characteristic of stabilization against ultra-violet radiation is now afforded to such materials due to the presence of the ultra-violet absorbing moiety chemically bonded to ester or amide, or carbon linkages of the polymer material. In the previous techniques, whereas ultra-violet absorbing compounds were merely admixed with polymer materials to effect a stabilization thereof, the amount of ultra-violet absorbing agent employed would vary from about 0.1% to about 10% based on the weight of the polymer. With the compositions of the present invention, much less ultra-violet absorbing moieties are necessary to effect the same degree of stabilization due to the greater deficiency in the distribution thereof throughout the polymer material, and thus where heretofore 0.1% would effect a slight stabilization of a given polymer, in the instant case an exceptional degree of stabilization is achieved with only slight amounts of ultra-violet absorbing moieties, especially after long exposure to light. In general, the amount of the ultra-violet absorbing compound to be chemically bonded to the polymer should range from about 0.1% to about 5% based on the weight of the polymeric material.

It is therefore an object of the present invention to provide new and useful compounds which are characterized by their outstanding ultra-violet absorbing properties.

It is still another object of the present invention to provide new and useful derivatives of 2,2′-dihydroxybenzophenones which are outstanding ultra-violet absorbing compounds.

It is still a further object of the present invention to provide new and useful 2,2′-dihydroxybenzophenone derivatives which are outsanding ultra-violet absorbers and which are capable of further reaction to form ester and/or amide linkages with hydroxyl and/or amine groups.

It is still another object of the present invention to provide new and useful derivatives of 2,2′-dihydroxybenzophenone which may be reacted with polymerizable materials or pre-formed polymers to yield polymeric compositions which exhibit ultra-violet absorbing characteristics.

It is still another object of the present invention to provide processes for the preparation of new and useful ultra-violet absorbing compounds which are derivatives of 2,2′-dihydroxybenzophenone.

It is still another object of this invention to provide processes for the preparation of polymeric materials which contain ultra-violet absorbing moieties as an integral part thereof, said ultra-violet absorbing moieties being derived from 2,2'-dihydroxybenzophenone compounds.

Other objects will appear hereinafter as the description proceeds.

The ultra-violet absorbing compounds which are contemplated herein for reaction with the polymer forming ingredients hereinafter to be described are characterized as ortho-ortho' dihydroxybenzophenone compounds which contain an ester grouping in one of the para positions relative to the keto group of the benzophenone compound. There may also be present in the other para position or in one of the ortho positions a similar ester grouping or a different one, or an oxysubstituent, e.g., alkoxy or substituted alkoxy wherein the alkyl moiety may contain one to 40 carbon atoms. The ester grouping has the following chemical configuration:

wherein R is the nucleus of a polycarboxylic acid such as a dicarboxylic acid, tricarboxylic acid, tetracarboxylic acid and the like, $n$ is 0 or 1, and X is hydroxy, halogen, or oxy lower alkyl, e.g., $OCH_3$, $OCH_2CH_2OCH_3$ and the like. The oxysubstituent which may be present in the second para positions (i.e., para to the keto group) or in the ortho positions as pointed out above, may contain substituted alkyls. These include hydroxy alkyl, halo alkyl, alkoxy alkyl, hydroxy alkoxy alkyl, cyanoalkyl and the like, as well as aryloxy and substituted aryloxys. In addition, the benzene nuclei of the benzophenone compound may contain other non-chromophoric substituents in the remaining free or unsubstituted positions. These include halogen, alkyl, cyano, substituted alkyl, e.g., hydroxyalkyl, cyano alkyl, haloalkyl and the like; $—SO_2$ alkyl (e.g.,

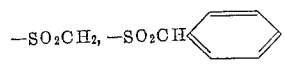

and the like).

A generic structural representation of the above described group of compounds may be given as follows:

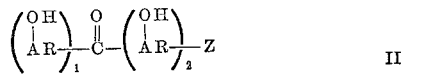

wherein $(AR)_1$ and $(AR)_2$ represent the monocyclic carbocyclic aromatic nuclei, i.e., benzene rings. The hydroxyl groups are ortho-ortho' with respect to the keto groups (i.e., vicinal thereto) and the Z group is the ester group:

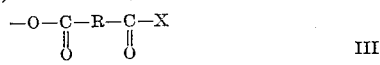

wherein R and X are as defined above. Again, as described previously, there may be present in $(AR)_1$ in the para position a Z group or any oxy substituent, again as defined above. Other substituents may be present as pointed out previously but no further chromophores are included.

The compounds herein contemplated may also be represented by the following general formula:

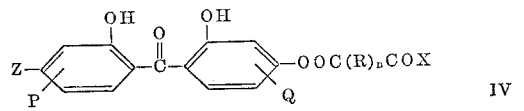

wherein R represents the moieties of a di- or polycarboxylic acid radical and $n=0$ or 1;

X represents hydroxyl, halogen (for example, chlorine or bromine), or $OR_1$ wherein $R_1$ is lower alkyl (i.e., 1 to 9 carbon atoms) or lower substituted alkyl;

Z may be hydrogen, hydroxyl, $—OOC(R)_nCOX$ (X as above), or OY (where Y may be alkyl of from 1 to 40 carbon atoms, or an alkyl group substituted by non-solubilizing groups: such non-solubilizing substituents in the alkyl radical may be halogen, hydroxyl, $OR_1$, $OR_2$, and nitrile, $R_1$ being lower alkyl and $R_2$ lower alkylol, both of from 1 to about 9 carbon atoms);

P and Q may be any non-chromophore such as hydrogen, halogen, alkyl, alkenyl, alkoxy, alkaryl, or other substituted alkyls such as haloalkyl, hydroxyalkyl, cyanoalkyl and the like. P may also be oxy (as Z) when Z is hydrogen and conversely Z may be any of the P substituents when P is oxy.

The compounds encompassed by the above general Formulas III and IV contain at least one functional grouping which is capable of forming an ester or amide linkage with hydroxyl, amino or amido groups. In general, the procedure for forming the stabilized polymeric compositions of the present invention involves admixing the above described compounds with any polymerizable monomer or partially polymerized polymer or fully polymerized polymer which contains hydroxyl, amino or amido groups, either before or during polymerization of said polymerizable material under such conditions that an interaction between the compounds is produced whereby esters and amides of the ultra-violet absorbing compound and the polymer result through the usual processes of esterification, transesterification and amidation.

The compounds of general Formula I are obtained by reacting a 2-hydroxybenzophenone compound with a di- or polycarboxylic acid or a monoester or anhydride thereof in such a manner that one or both of the 4-hydroxy groups of the 2-hydroxybenzophenone compound are esterified. The resulting product may be employed as such for interaction with the polymer or polymer forming ingredients or may be converted and used as an ester or acid chloride.

It is, of course, understood that the di- or polycarboxylic acids contemplated, as illustrated below, includes oxalic acid and that, in this instance, $n=0$ and R does not exist.

The benzeophenone compounds of the 2-hydroxybenzophenone type which may be employed as intermediates in the present invention include the following:

2,2',4'-trihydroxybenzophenone and the following substituted derivatives thereof:

3-allyl
5-allyl-3-methoxy
5 benzyl
5-benzyl sulfonyl
3-bromo
5-bromo
6-bromo-5(1,3-dihydroxypropyl)
4-caproyl
3-chloro
4-chloro
5-chloro
3,5-dibromo
5(1,1-dibromo-2,2-dichloro-1-cyanoethyl)
3,5-dichloro
3,5-di-isopropyl
3,4-dimethoxy
4,5-dimethoxy
3,5-dimethyl
4,5-dimethyl
4,6-dimethyl
3-ethoxy
4-ethoxy
5-ethyl
6-ethyl
4-cyano
5(1-chloropropyl)
5-chloro-4-methyl
5-bromo-4-methyl
3,5-dibromo-4-methyl
5-ethyl-3-phenyl
4-cluoro
5-fluoro
5-isobutyryl
3-isopropyl
3-methoxy
4-methoxy
6-methoxy 3-methoxy-5-propenyl
3-methyl
4-methyl
5-methyl
6-methyl
4-propoxy
4,5,6-trichloro
3,4,6-trimethyl, and the like.
2,2′,4,4′-tetrahydroxybenzophenone and the following substituted derivatives thereof:
6-amyl
6-amyl-3,5-dibromo
5-bromo
3,6-dimethyl
3-ethyl
5-ethyl
3-ethyl-5-isopropenyl
5-ethyl-3-methyl
6-heptyl
3-methyl
5-methyl
6-methyl
5-phenethyl
6-propyl
5-chloro-6-methyl
3,5-dichloro
6-pentyl
3-bromo-5-ethyl
5-butyl
5-chloro
5-hydroxyethyl
5-hexyl
5-cyanoethyl
5-chloroethyl
6-hydroxypropyl
6-chloropropyl
6-methoxyethyl
5-ethoxyethyl, and the like.

Many of the above described benzophenone compounds are novel, and all of these new compounds may be prepared by the general processes described in U.S. Patents 2,854,485 and 2,921,962. In these patents, methods are described wherein an ortho-hydroxyarylcarboxylic acid is condensed with a selected phenol to yield the corresponding polyhydroxybenzophenone employing as a catalyst either a mixture of phosphorus oxychloride and zinc chloride in the presence of 85 to 98% phosphoric acid, or as the catalyst system, a mixture of phosphorus trichloride and zinc chloride in the presence of phosphoric acid of strength 100 to 106%. In the examples which follow below, there are illustrated various preparations for some of the novel benzophenone compounds above described.

The di- and polybasic acids which may be used to form the carboxyl moiety of general Formula I include the following:

oxalic
malonic
succinic
glutaric
adipic
pimelic
azelaic
maleic
sebacic
chloromalonic
dichloromalonic
bromomalonic
dibromomalonic
diiodomalonic
chlorosuccinic
α,α′-dichlorosuccinic
bromosuccinic
α,α′-dibromosuccinic
α-chloro-α′-bromosuccinic
chloro-methyl malonic
α-chloro glutaric
β-bromo glutaric
ethyl malonic
α-chloro ethyl malonic
α-bromo ethyl malonic
γ-bromo ethyl malonic
α,γ-dibromo ethyl malonic
β,β-dichloro adipic
α-bromo adipic
β-bromo adipic
α,α′-dibromo adipic
β,β′-dibromo adipic
α-methyl glutaric
β-bromo-α-methyl glutaric
α′-bromo-α-methyl glutaric
propyl malonic
[β-bromo-propyl] malonic
β-bromo-β-methyl glutaric
methyl ethyl malonic
isopropyl malonic
butyl malonic
α-methyl adipic
β-ethyl glutaric
methyl propyl malonic
isobutyl malonic
β,β-dimethyl glutaric
diethyl malonic
α,α′-dibromo suberic
α,α-dimethyl adipic
α,α′-dimethyl adipic
α,α′-dibromo azelaic
α,α′-dibromo sebacic
n-heptyl malonic
tetradecyl malonic
eicosyl malonic
dicetyl malic
dichloromaleic
bromomaleic
glutaconic
itaconic
chloroconic
methyl maleic (citraconic)
ethylidene malonic
hexene-2-dicarboxylic acid
dihydromuconic
α-methyl glutaconic
γ-methyl itaconic
ethyl citraconic
γ-isobutyl itaconic
β′-methyl-α-allyl adipic
α-isoamyl-α′-isoamylidene glutaric
2-allyl adipic
hexyl-allyl malonic
tetradecyl maleic
12,15-dimethyl-docosene (1,2)-dicarboxylic acid (1,1)
eicosene (8)-dicarboxylic acid (1,20)
cyclopropane dicarboxylic acid (1,2)
cyclobutane dicarboxylic acid (1,2)
1,2-dibromo cyclobutane dicarboxylic acid (1,2)
cyclobutane dicarboxylic acid (1,3)
3-methyl cyclopropane dicarboxylic acid (1,2)
cyclopentane dicarboxylic acid (1,2)
cyclopentane dicarboxylic acid (1,3)
1,2-dimethylpentane dicarboxylic acid (1,2)
1,1-dimethylpentane dicarboxylic acid (2,3)
cyclohexane dicarboxylic acid (1,2)
cyclohexane dicarboxylic acid (1,3)
2-bromohexane dicarboxylic acid (1,3)
cyclohexane dicarboxylic acid (1,4)
1-bromohexane dicarboxylic acid (1,4)
1,2-dibromohexane dicarboxylic acid (1,4)
cyclopentyl malonic acid
cyclohexyl malonic acid 1,2-dimethyl cyclopentane dicarboxylic acid (1,3)
cyclobutene-(1)-dicarboxylic acid (1,2)
cyclopentene-(1)-dicarboxylic acid (1,2)
cyclohexene-(1)-dicarboxylic acid (1,2)
cyclohexene-(2)-dicarboxylic acid (1,2)
cyclohexene-(4)-dicarboxylic acid (1,2)
cyclohexene-(4)-dicarboxylic acid (1,3)
cyclohexene-(2)-dicarboxylic acid (1,4)
symm. spiroheptane-dicarboxylic acid
cyclohexadiene-(2,4)-dicarboxylic acid (1,2)
cyclohexadiene-(1,4)-dicarboxylic acid (1,4)
phthalic
isophthalic
terephthalic
3-chlorophthalic
4-chlorophthalic
3,4-dichlorophthalic
3,5-dichlorophthalic
3,6-dichlorophthalic
3,4,5-trichlorophthalic
tetrachlorophthalic
3-bromophthalic
4-bromophthalic
5-chloro-4-bromo-phthalic
3,5-dichloro-4-bromo-phthalic
3-iodo phthalic
4-iodo phthalic
4-chloro isophthalic
4,6-dichloro isophthalic
2,4,6-trichloro isophthalic
4-bromo isophthalic
4,6-dibromo isophthalic
terephthalic
3-sulfamyl phthalic
4-sulfamyl phthalic
2,5-dichloro terephthalic
5-chloro-2-bromo terephthalic
2,5-dibromo terephthalic
phenyl malonic
2-carboxyl-phenyl acetic
3-methyl phthalic
2-methyl isophthalic
4-methyl phthalic
4-methyl isophthalic
5-methyl isophthalic
benzyl malonic
o-phenylene diacetic
p-phenylene diacetic
α-benzyl glutaric
β-benzyl glutaric
β,p-tolyl glutaric
o-xylylendiacetic
α-methyl-β-phenyl glutaric
5-tert. butyl-isophthalic
tetramethyl phthalic
α-methyl-α'-benzyl glutaric
phenyl maleic
benzal malonic
2-chloro benzal malonic
2-bromo benzal malonic
γ-phenyl itaconic
phenyl citraconic
β-phenyl glutaconic
2-methyl benzal malonic
3-phenyl cyclopropane dicarboxylic acid (1,2)
cinnamyl malonic
β-benzal glutaric
4-isopropyl benzal malonic
benzal glutaconic
naphthalene dicarboxylic acid (1,8)
naphthalene dicarboxylic acid (1,4)
naphthalene dicarboxylic acid (1,5)
naphthalene dicarboxylic acid (2,7)
diphenyl dicarboxylic acid (2,2' [diphenic]
4-chlorophenyl dicarboxylic acid (2,2')
4-bromophenyl dicarboxylic acid (2,2')
5-bromophenyl dicarboxylic acid (2,2')
4,4'-dibromophenyl dicarboxylic acid (2,2')
diphenyl dicarboxylic acid (2,3')
diphenyl dicarboxylic acid (2,4')
diphenyl dicarboxylic acid (3,5)
diphenyl dicarboxylic acid (3,3')
diphenyl dicarboxylic acid (4,4')
diphenyl malonic
diphenyl maleic
cyclopropane tricarboxylic (1,2,3)
cyclopentane tricarboxylic (1,2,4)
tricarballylic [1,2,3-propane tricarboxylic]
benzene tricarboxylic (1,2,3) [hemimellitic]
benzene tricarboxylic (1,3,5) [trimesic]
benzene tricarboxylic (1,2,4) [trimellitic]
4,6-dichloro hemimellitic
5-sulfamyl trimellitic
diphenyl tricarboxylic acid (2,3,4')
diphenyl tricarboxylic acid (2,4,3')
pyromellitic (1,2,4,5-benzene tetracarboxylic acid)
3,5-dicarboxy phenyl acetic
malic
citric
tetrahydrofurane dicarboxylic acid (2,5)
tetrahydropyrane dicarboxylic acid (4,4)
2,2,6-trimethyl tetrahydropyrane dicarboxylic acid (3,6)
2-methyl-5-isopropyl tetrahydrofurane dicarboxylic acid (2,5)
2,3-dihydrofuran dicarboxylic acid (2,5)
2,5-dihydrofuran dicarboxylic acid (2,5)
furane dicarboxylic acid (2,5)
2,5-dimethyl furane dicarboxylic acid 3,4)
furan-di (p-propionic acid) (2,5)
3,4-diphenylene thiophene dicarboxylic acid (2,5)
4,5-methylene dioxy phthalic
pyrrolidine dicarboxylic acid (2,2)
pyrrolidine dicarboxylic acid (2,5)
N-phenyl pyrrolidine dicarboxylic acid (2,5)
piperidine dicarboxylic acid (2,3)
piperidine dicarboxylic acid (2,6)
piperidine dicarboxylic acid (3,4)
N-methyl piperidine dicarboxylic acid 2,6)
pyrrolidine α-carboxylic acid-α'-acetic acid
3-methyl pyrrolidine dicarboxylic acid (2,5)
pyrrole dicarboxylic acid (2,5)
N-ethyl pyrrole dicarboxylic acid (2,5)
N-phenyl pyrrole dicarboxylic acid (2,5)
3,4-dibromo pyrrole dicarboxylic acid (2,5)
3,5-dimethyl pyrrole dicarboxylic acid (2,4)
1-phenyl-2,5-dimethyl pyrrole dicarboxylic acid (3,4)
pyrridine dicarboxylic acid (2,3)
pyridine dicarboxylic acid (2,4)
5-bromo pyridine dicarboxylic acid (2,3)
pyridine dicarboxylic acid (2,6)
4-chloropyridine dicarboxylic acid (2,6)
2,6-dichloro pyridine dicarboxylic acid (3,5)
4-ethyl pyridine dicarboxylic acid (3,5)
4-methyl-5-ethyl pyridine dicarboxylic acid (2,3)
quinoline dicarboxylic acid (2,3)
quinoline dicarboxylic acid (2,4)
2-methyl quinoline dicarboxylic acid (3,4)
4-phenyl pyridine dicarboxylic acid (3,5)
5-methyl pyrrole tricarboxylic acid (2,3,4)
2,4,6-pyridine tricarboxylic acid (trimesitic)
pyrazole dicarboxylic acid (3,4)
1-phenyl pyrazole dicarboxylic acid (3,4)
imidazole dicarboxylic acid (4,5)
4-methyl pyrazole dicarboxylic acid (3,5)
pyrimidine dicarboxylic acid (4,5)
benzimidazole dicarboxylic acid (2,4)
quinoxaline dicarboxylic acid (2,3)
5-methyl isoxazole dicarboxylic acid (3,4)
2-methyl thiazole dicarboxylic acid (4,5)

and the like and their anhydrides and acid chlorides.

As indicated above, the prepared acid derivatives may be used as such in the free acid form and the esters, or they may be converted to acid halides, for example, acid chlorides and bromides, and used in this form.

The following exemplify some of the specific compounds within the general Formula I above:

(1) 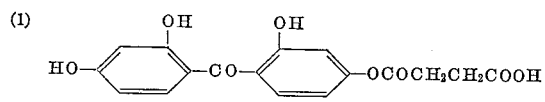

(2) 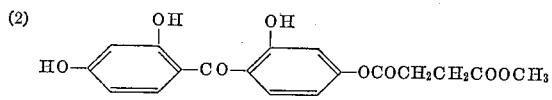

(3) 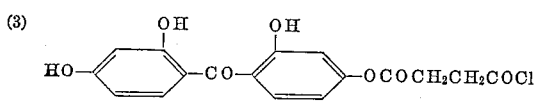

(4) 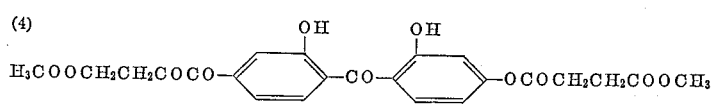

(5) 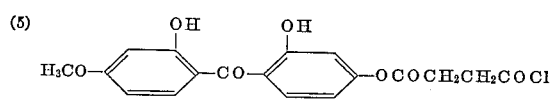

(6) 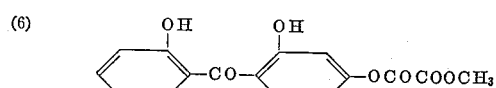

(7) 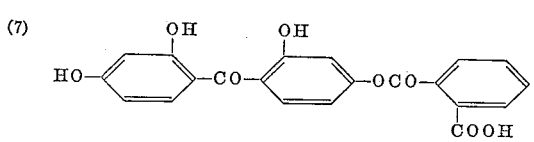

(8) 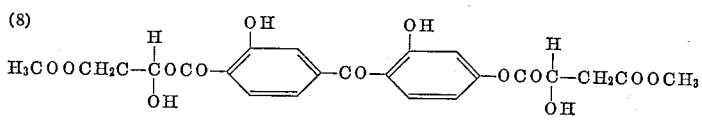

(9) 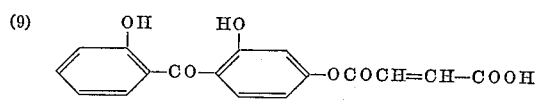

(10) 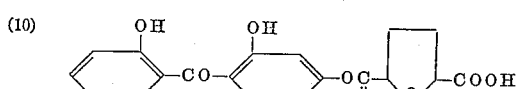

(11) 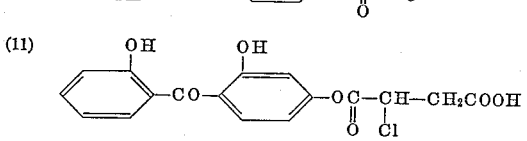

(12) 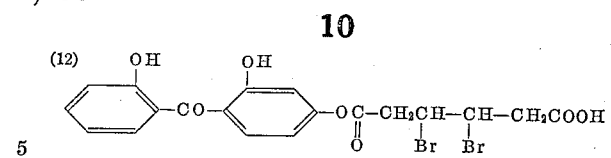

(13) 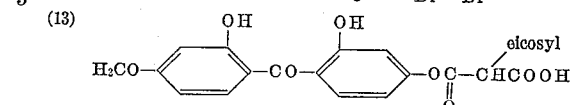

(14) 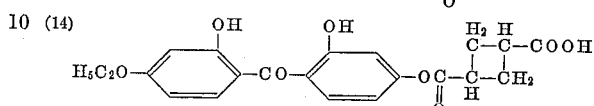

(15) 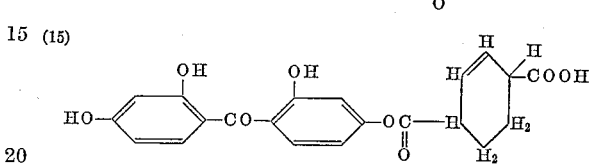

(16) 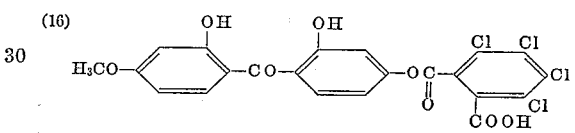

(17) 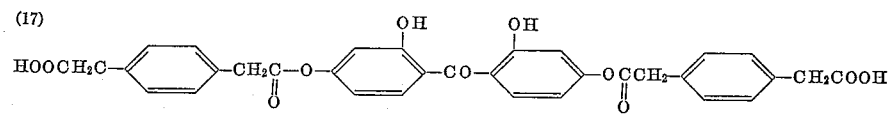

(18) 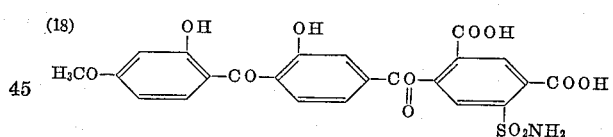

(19) 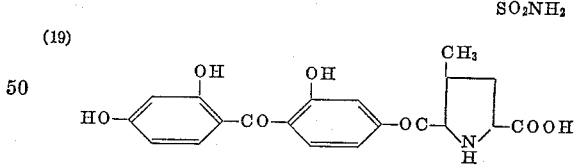

(20) 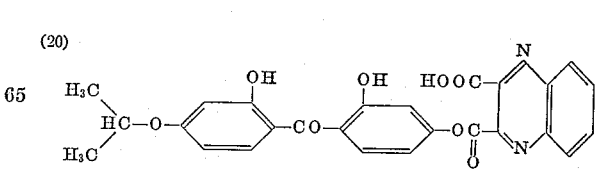

A general method of preparing such esters of 2-hydroxybenzophenone and di- or poly-carborylic acids is as follows: the ultra-violet absorber is dissolved in a slightly alkaline (pH 8–9) aqueous solution and maintained at that pH during the addition of an acid anhydride or acid chloride of the di- or poly-carboxylic acids. The temperature of the reaction may be carried out at from about room temperature to reflux, but preferably at room temperature to about 70° C. To prepare the monoester, it is necessary to use one mole of hydroxybenzophenone compound per one mole of acid anhydride or acid chloride, although in practice it is customary to use an excess of acid anhydride or acid chloride, up to 100% excess due to the possibility of accompanying hydrolysis of the acid anhydride or chloride in the aqueous alkaline solution during esterification. Likewise if a diester is to be produced, a minimum of two moles acid anhydride or acid chloride per one mole of hydroxybenzophenone compound is required, but in practice excess acid anhydride or acid chloride is employed. In carrying out the esterification, it is predominantly the 4 and 4'-hydroxysubstituents that are esterified, although the final products may contain other isomers, unreacted material and the like. For example, if 2,2'-4,4'-tetrahydroxybenzophenone is esterified with a slight excess over one mole of succinic anhydride, there results predominantly

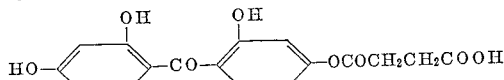

although there may be some of the product

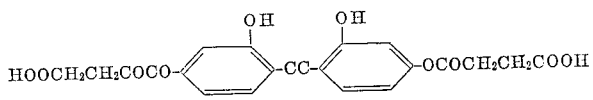

together with minor amounts of 2-esterified compounds and some of the initial reactants. Such a mixture may be employed as a co-polymerizable ultra-violet absorber, or the mixture may be separated into its components and only the effective ultra-violet absorbing components employed.

In reacting the above compounds with polymerizable compositions or preferred polymers, the acid derivatives per se, or the acid derivatives converted in known manner to acid chlorides or carbalkoxy derivatives are added to the polymerizable equivalent of, for example, 2,2',4'-trihydroxybenzophenone with 3 equivalents of pyridine in benzene, cooling and adding 1.2 equivalents of the acid chloride of the carboxylic compound. Thus 1 equivalent of

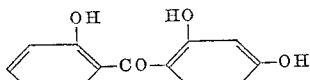

and 3 equivalents of pyridine in benzene is stirred and cooled to 5° C. There is added dropwise over a period of 1 hour 1.2 equivalents of

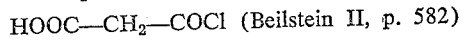

After a few minutes the solution is washed first with water, then dilute HCl, and finally saturated Na$_2$CO$_3$ solution. The benzene is evaporated under reduced pressure to yield crude

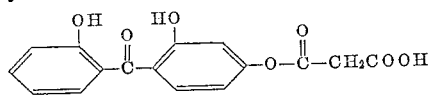

The crude product is recrystallized from alcohol and water.

In reacting the above compounds with polymerizable compositions or preferred polymers, the acid derivatives per se, or the acid derivatives converted in known manner to acid chlorides or carbalkoxy derivatives are added to the polymerizable compound. Unless the ultra-violet agents are soluble in the polymerizable compounds, they may be dissolved in a small amount of solvent which is also compatible with the polymerizable composition and the solution mixed with the polymerizable composition.

As an alternative the ultra-violet agent may be added to the polymerizable composition in dispersed form.

The polymerizable compositions include solutions or melts of monomers, partially polymerized polymers, or preferred polymers which contain free hydroxy or phenolic groups and amine groups as illustrated by the following:

(1) alkyd resin forming compositions as illustrated by dibasic acids and polyalcohols, e.g., phthalic acid and glycol or glycerol;

(2) phenol-formaldehyde resin forming compositions;

(3) melamine-formaldehyde resin forming compositions;

(4) nylon type resin forming compositions;

(5) amine-formaldehyde resin forming compositions such as aniline and formaldehyde;

(6) unsaturated compounds as, for instance, styrene or maleic or acrylic monomers or polymers.

In addition to the use of such compounds as additives which react in resin forming compositions, it is to be understood that the compounds per se may be employed as one component of a polymerizable composition.

The following examples will serve to illustrate the present invention whereby compounds of general Formula I are prepared as well as the application thereof in polymer materials. These examples are not to be considered limitative of the present invention. Where parts are specified these are to be interpreted as parts by weight unless otherwise indicated.

EXAMPLE 1

Preparation of:

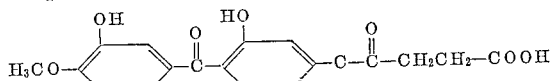

Into a dry 500 cc. flask fitted with a stirrer, thermometer, reflux condenser, drying tube and heating mantle there are charged 52.8 gm. of 2,2'-4-trihydroxy-4'-methoxy benzophenone (0.16 mol, M.W.=264=80%) and 150 ml. of dry picoline. At room temperature 16.0 gm. of succinic anhydride is added gradually, keeping the temperature below 60° C. The material is held 1 hour at 60° C., then drowned into 500 ml. water at 10°–15° C., and acidified to Congo grey with 100 ml. acetic acid. The water is decanted at 5° C. The oil is re-slurried in 500 cc. water, the pH adjusted to Congo grey with glacial acetic acid; water is decanted at 5° C., and oil is re-slurried in 500 cc. water which is decanted at 5° C. The oil is then dissolved in 500 cc. benzene, nuchared (treatment with activated carbon) and filtered, then the benzene is evaporated. Dried in air, the yield is 44 gm. of crude product. The material is recrystallized to give the desired product having the formula

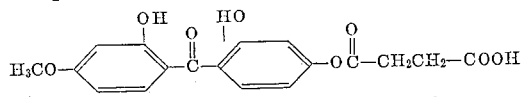

Application of the product to a styrene-polyester resin is carried out as follows: 1 mole phthalic anhydride, 1 mole succinic anhydride, 2 moles diethylene glycol and 0.214% of above prepared ultra-violet agent are reacted and diluted to 60% solids with styrene. The finished product is cured in a mold, then exposed in a fadeometer for 100 hours. The material so prepared is distinctly better than the product prepared by first forming the polymer, and later adding the same percentage of ultra-violet absorber, and milling it until homogeneous.

The 2,2',4-trihydroxy-4'-methoxybenzophenone may be prepared in the manner described in Example VIII of U.S. Patent 2,921,962.

EXAMPLE 2

Preparation and application to polyester of:

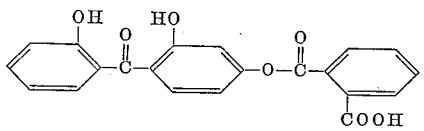

Equimolar amounts of 2,4,2'-trihydroxybenzophenone and phthalic anhydride are heated together at 140° C. for 2 hours. A product of the above formula is isolated. This product is incorporated into styrene-polyester resin in the same fashion as in Example 1 above. The absorber is also very effective in stabilizing the resin.

The application to an alkyd polymer is carried out as follows: a mixture consisting of 1 mole of phthalic anhydride, 1 mole of maleic anhydride and 2 moles of glycerol is cut with 40% styrene and mixed with 0.2% of total weight of the above resin-forming reactants of:

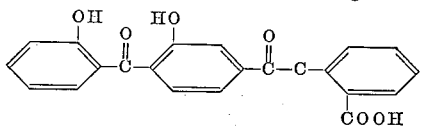

The mixture is heated at 160° C. for 3 hours. This polymerized mixture is faster to light and heat in the fadeometer after 100 hours than a similar mixture free from the 2-hydroxybenzophenone compound. In the same way when the above absorber is added to the finished polymer after polymerizing the plastic, and then milling until homogeneous (before complete polymerization has occurred), a final product of less fastness to heat and light is obtained.

EXAMPLE 3

Preparation of:

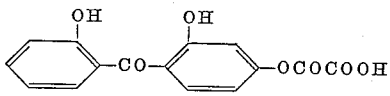

This compound is prepared in the same manner as the absorber of Example 1, substituting an equimolar amount of

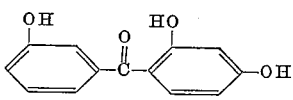

for benzophenone starting compound of that example and an equimolar amount of oxalyl chloride, for the succinic anhydride used in Example 1. The product is used in polyester resin exactly as the compound of Example 1.

EXAMPLE 4

Preparation of:

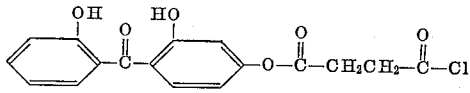

and application to melamine-formaldehyde resin
Preparation of:

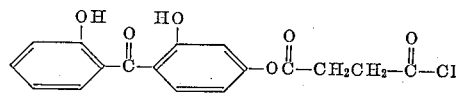

is carried out by refluxing 1 mole of

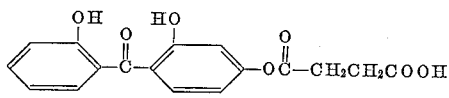

with a twofold weight excess of thionyl chloride for 3 hours, then distilling the excess thionyl chloride to leave an essentially dry product. The crude product is formula:

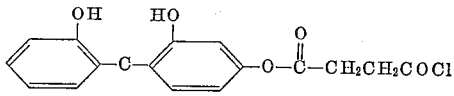

is used as such in melamine-formaldehyde resin.

The condensation between 1 molar equivalent of melamine and 2½ molar equivalents of formaldehyde is carried out at 90° C. using aqueous formaldehyde (40%) and partial vacuum. Comparison between resin polymerized using 1% (based on total weight of plastic solids) of

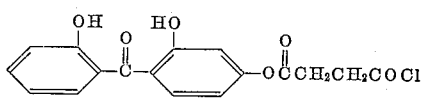

with resin free from ultra-violet absorber shows greater light stability in the resin copolymerized with the absorber.

EXAMPLE 5

Another method of accomplishing the same essential result as in Example 4 is to treat one mole of

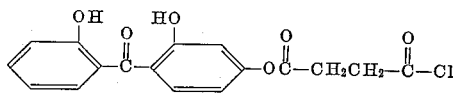

with 1 mole of melamine to give the product of the formula:

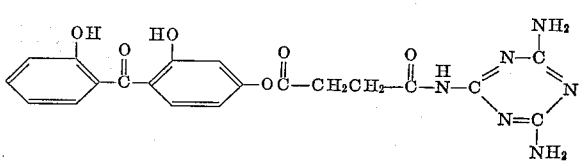

The latter compound at 1% concentration is then mixed with melamine-formaldehyde and copolymerized exactly as in Example 4.

EXAMPLE 6

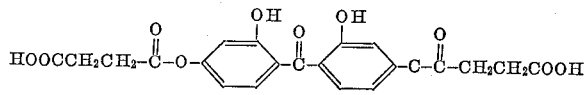

in polyester. This is prepared as in Example 1, using an equivalent amount of 2,2',4,4' - tetrahydroxy benzophenone and 32 g. of succinic anhydride.

EXAMPLE 7

In place of the ultra-violet absorbing compound of Example 1, an equimolar quantity of

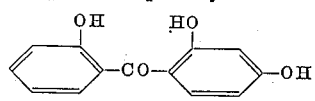

is reacted with succinic anhydride. Application to resin as in Example 1 results in a product having improved ultra-violet properties over a similar resin prepared without the ultra-violet agent.

EXAMPLE 8

In place of the ultra-violet absorbing compound of Example 2, an equimolar amount of

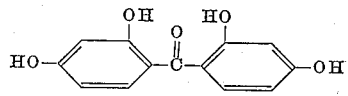

is reacted with two equimolar amounts of phthalic anhydride. There results a product of the formula:

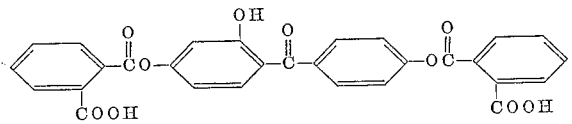

which, when employed in resin formation in the manner of Example 2 results in the production of a resin having improved ultra-violet properties.

EXAMPLE 9

Preparation of:

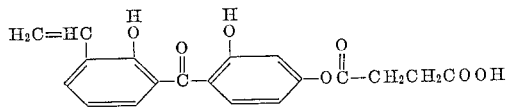

A. Preparation of 2,2′,4′-trihydroxy-3-vinylbenzophenone:

- 300 g. of polyphosphoric acid (103% phosphoric acid content)
- 40 g. of 3 vinyl salicylic acid
- 25.2 g. resorcinol and
- 67.0 g. of zinc chloride are stirred together at 25° C. until a uniform slurry is formed. Over a two hour period 38 g. of phosphorous trichloride is added and the temperature during this addition rises to about 35° C. The temperature is then raised at the rate of about 5 degrees per hour for 4 hours until a temperature of 55–60° C. is reached. This temperature is maintained for 16 hours, after which the charge is drowned in several liters of ice and water, filtered and washed with cold 5% aqueous sodium bicarbonate solution. The charge is then dissolved in hot water made slightly acid with HCl, treated with Nuchar (activated carbon) and a very small amount of zinc, dust, filtered, cooled and crystallized and filtered. 45 g. of 2,2′,4′-trihydroxy-3-vinylbenzophenone is obtained.

B. Example 1 is now repeated employing, however, in lieu of the 4′ - methoxy derivative of that example an equivalent weight of the 3 - vinyl compound prepared in A.

C. The product produced in B above is incorporated into a polyester resin as in Example 1, and yields a well stabilized product.

EXAMPLE 10

Preparation of:

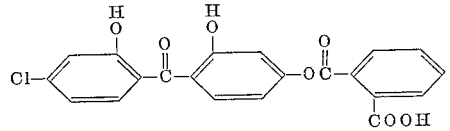

A. Preparation of 2,2′,4′ - trihydroxy - 4 - chlorobenzophenone. This compound is prepared in the manner described in Example 6 of U.S. Patent 2,921,962.

B. The procedure of Example 2 above is repeated employing the 4-chloro derivative prepared in A above in lieu of the unsubstituted trihydroxybenzophenone of Example 2.

EXAMPLE 11

Preparation of:

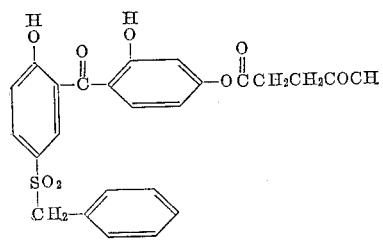

A. Preparation of 5 - benzylsulfonyl - 2,2′4′ - trihydroxy benzophenone. This compound is prepared in a manner similar to the 3 - vinylbenzophenone described above except that 5 - benzylsulfonyl salicylic acid in equivalent amounts is employed in lieu of the 3 - vinyl derivative.

B. Example 1 is again repeated except that the above prepared 5 - benzylsulfonyl derivative in equivalent amounts is employed in lieu of the 4′ - methoxy compound of Example 1.

EXAMPLE 12

Preparation of:

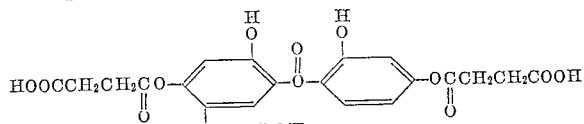

A. Preparation of 5-hydroxyethyl-2,2′,4,4′-tetrahydroxy benzophenone. Example 2 of U.S. Patent 2,921,962 is repeated except that in lieu of β-resorcylic acid, an equivalent weight of the 5-hydroxyethyl derivative thereof is used.

B. Example 1 above is again repeated employing, however, a mole ratio of succinic anhydride to the compound of A above of 2:1, thereby to yield the di-ester.

EXAMPLE 13

Preparation of:

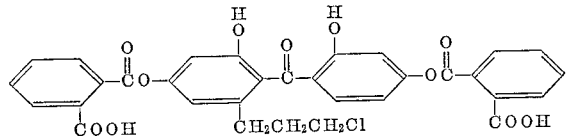

A. Preparation of 6-chloropropyl - 2,2′,4,4′ - tetrahydroxy-benzophenone. Part A of Example 12 above is repeated except that the 6-chloropropyl derivative is employed in lieu of the 5-hydroxy-ethyl derivative.

B. Example 8 above is repeated again employing 2 moles of phthalic anhydride per mole of the benzophenone compound.

EXAMPLE 14

Preperation of:

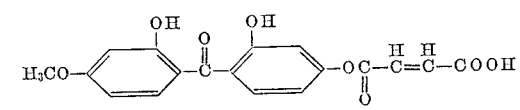

is carried out as in Example 1, substituting an equimolecular amount of maleic anhydride for the succinic anhydride of Example 1.

Application of this compound to styrene-maleic anhydride copolymer is carried out as follows:

A mixture is made of ¼ gm. of the above absorber and 100 gms. of Polylite 8000 [1] containing 1 gm. of Luperco ATC (50% benzoyl peroxide). A casting is made between glass plates treated with mold release agent (Dri-Film SC-87). Gasket material is used between the plates; they are pressed together and the final copolymerization is carried out by raising the temperature to 90° C., holding for 1 hour, raising to 120° C., curing for ½ hour. In this technique a copolymer is made wherein the ultra-violet absorber is cross-linked with the polymer by means of the double bonds of each. The light-fastness of the plastic containing the ultra-violet absorber is far superior to the plastic made up without ultra-violet absorber, and

---

[1] Polylite 8000 is an unsaturated ester polymer manufactured by Reichold Chemicals consisting of styrene-maleic anhydride—phthalic anhydride—ethylene glycol.

even superior to the plastic made up with an equal molar amount of

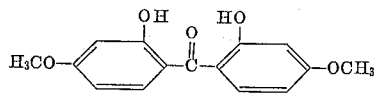

in place of the copolymerizable absorber shown above.

EXAMPLE 15

Preparation of:

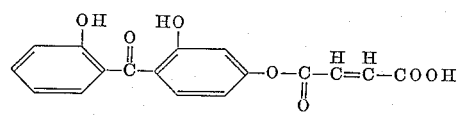

is carried out in the same manner as in Example 14. Application in Polylite 8000 is carried out as in Example 14.

EXAMPLE 16

Example 1 is repeated employing as the benzophenone the following compounds:

A. 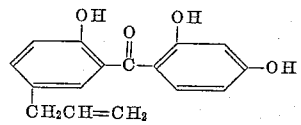

B. 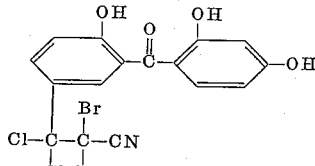

C. 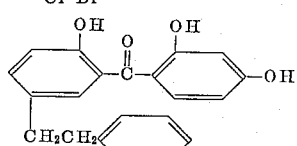

D. 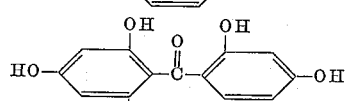

E. 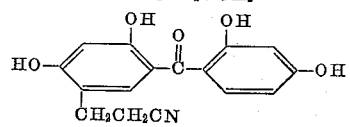

EXAMPLE 17

Example 1 is repeated using the following compounds in equivalent amounts in place of succinic anhydride.
A. adipic anhydride.
B. α,α'-dichlorosuccinic anhydride.
C. tetradecyl maleic anhydride.
D. cyclobutane dicarboxylic acid (1, 2) anhydride.
E. 3,4-dichlorophthalic anhydride.

Other variations in and modifications of the described processes which will be obvious to those skilled in the art can be made in this invention without departing from the scope or spirit thereof.

We claim:

1. 2,2'-dihydroxybenzophenone containing in one ring a group of the formula:

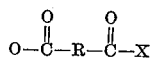

in a para position and in the other ring not more than one oxy substituent selected from hydroxy, lower alkoxy, and radicals of the formula:

in a para position; R is the nucleus of a polycarboxylic acid selected from succinic acid, phthalic acid and halogen and lower alkyl substituted derivatives thereof; X is a radical selected from the group consisting of hydroxy, halogen an $OR_1$; and $R_1$ is a lower alkyl radical of from 1 to 9 carbon atoms.

2. 2,2'-dihydroxybenzophenone containing in the 4,4'-positions a group of the formula:

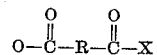

R is the nucleus of a polycarboxylic acid selected from succinic acid, phthalic acid, and halogen and lower alkyl substituted derivatives thereof; each X is a radical independently selected from the group consisting of hydroxy, halogen, and $OR_1$ and wherein $R_1$ is a lower alkyl radical of from 1 to 9 carbon atoms.

3. Compound of the formula:

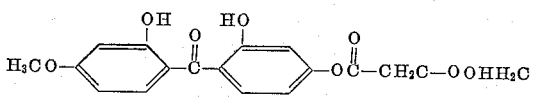

4. Compound of the formula:

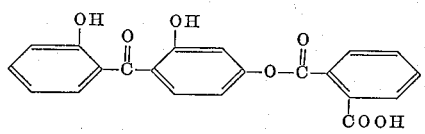

5. Compound of the formula:

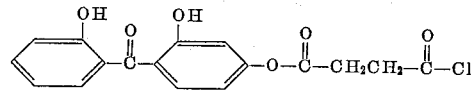

6. Compound of the formula:

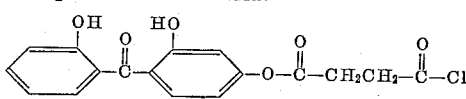

7. Compound of the formula:

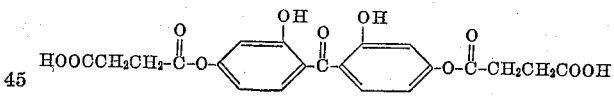

8. Compound of the formula:

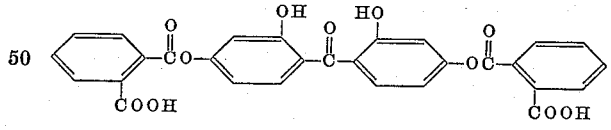

9. Compound of the formula:

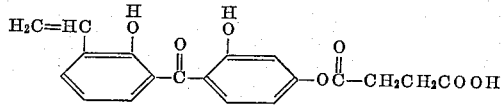

10. Compound of the formula:

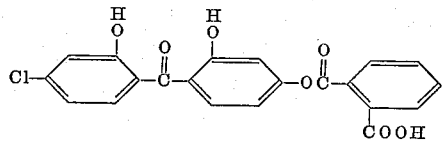

References Cited

UNITED STATES PATENTS 3,072,602   1/1963   Clark et al. _____ 260—45.85

LORRAINE A. WEINBERGER, *Primary Examiner.*

R. K. JACKSON, *Examiner.*

T. L. GALLOWAY, *Assistant Examiner.*